(12) United States Patent
Kuhn

(10) Patent No.: US 12,472,905 B2
(45) Date of Patent: Nov. 18, 2025

(54) FILLER NECK OF A WATER TANK OF A MOTOR VEHICLE

(71) Applicant: Dr. Ing. h.c. F. Porsche Aktiengesellschaft, Stuttgart (DE)

(72) Inventor: Lukas Kuhn, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 8 days.

(21) Appl. No.: 18/625,262

(22) Filed: Apr. 3, 2024

(65) Prior Publication Data
US 2024/0336213 A1    Oct. 10, 2024

(30) Foreign Application Priority Data
Apr. 4, 2023   (DE) .................... 102023108535.2

(51) Int. Cl.
*B60S 1/50*    (2006.01)
*B60K 15/04*   (2006.01)
*B60R 16/08*   (2006.01)

(52) U.S. Cl.
CPC ............... *B60S 1/50* (2013.01); *B60K 15/04* (2013.01); *B60R 16/08* (2013.01)

(58) Field of Classification Search
CPC ...... B60S 1/50; B67C 2011/30; B60K 15/035
See application file for complete search history.

(56) References Cited

U.S. PATENT DOCUMENTS

| | | | | |
|---|---|---|---|---|
| 1,498,900 A | * | 6/1924 | Barnett | F01P 11/0214 220/86.1 |
| 3,802,596 A | * | 4/1974 | Schmidt | B60K 15/03504 220/746 |
| 4,494,585 A | * | 1/1985 | Waldecker | B67C 11/00 141/297 |
| 4,759,458 A | * | 7/1988 | Fischer | B60K 15/04 138/109 |
| 5,570,730 A | * | 11/1996 | Keehn, Jr. | B63B 25/082 141/59 |
| 5,894,809 A | * | 4/1999 | Grigaitis | B63B 25/082 114/364 |

FOREIGN PATENT DOCUMENTS

| | | |
|---|---|---|
| CN | 204452373 U | 7/2015 |
| DE | 102011118929 A1 | 5/2013 |
| DE | 102015204791 A1 | 9/2015 |
| DE | 102014018366 A1 | 6/2016 |
| DE | 102018105986 A1 | 9/2019 |
| DE | 202019105713 U1 | 10/2019 |
| DE | 102018128853 A1 | 5/2020 |
| EP | 2316700 A1 | 5/2011 |

* cited by examiner

*Primary Examiner* — Timothy P. Kelly
(74) *Attorney, Agent, or Firm* — Buchanan Ingersoll & Rooney PC

(57) ABSTRACT

A filler neck of a water tank of a motor vehicle includes a nozzle element having a filling opening, a drain opening, a drain cylinder arranged at the drain opening, and a vent opening is provided for venting the water tank. The drain cylinder is in operative connection with the water tank. The filling opening is surrounded by a funnel edge of the nozzle element, which is configured to receive a cover. The nozzle element includes an overflow opening configured independently of the filling opening and the vent opening.

14 Claims, 3 Drawing Sheets

FILLER NECK OF A WATER TANK OF A MOTOR VEHICLE

CROSS-REFERENCE TO RELATED APPLICATION

This application claims priority to German Patent Application No. 10 2023 108 535.2, filed Apr. 4, 2023, the content of such application being incorporated by reference herein in its entirety.

FIELD OF THE INVENTION

The invention relates to a filler neck of a water tank of a motor vehicle.

BACKGROUND OF THE INVENTION

Motor vehicles with a liquid container or water tank are known. The liquid containers or water tanks have a filler neck through that can be used to fill liquid into the liquid container or water into the water tank.

A water tank having a filler neck with a cover made of plastic is known from publication DE 10 2018 105 986 A1, which is incorporated by reference herein. The filler neck has a rigid pipe section whose inlet opening can be closed with the cover. A vent line is configured on the pipe section, which is connected to the water tank so that water can flow through it. Even with a closed inlet opening, a flow through the vent line is possible, because it is not sealed when the inlet opening is closed.

A filler neck with a screw cap is known from the publications DE 20 2019 105 713 U1 and EP 2 316 700 A1, which are incorporated by reference herein, wherein the filler neck is operatively connected to a water tank by means of a hose or a pipe section that can be inserted into the filler neck.

A coolant tank having a filler neck is referred to in publication DE 10 2014 018 366 A1, which is incorporated by reference herein, wherein the filler neck has a valve at its inlet opening which seals a cooling system having the coolant tank against overpressure, and through which the coolant tank may be filled with the coolant.

Publications CN 204452373 U and DE 10 2018 128 853 A1, which are incorporated by reference herein, each disclose a filler neck for a water tank of a motor vehicle, wherein the filler neck has a hinge cover at its inlet opening.

A filler neck for a fluid container is known from the publication DE 10 2011 118 929 A1, which is incorporated by reference herein, which is connected to the liquid container via a filling pipe and a filling vent line running parallel to the filling pipe.

A filler neck for a liquid container which is connected to the liquid container by means of a connecting line is referred to in publication DE 10 2015 204 791 A1, which is incorporated by reference herein.

SUMMARY OF THE INVENTION

A filler neck of a water tank of a motor vehicle according to aspects of the invention has a nozzle element with a filling opening and a drain opening, wherein a drain cylinder of the nozzle element is arranged at the drain opening. The drain cylinder is operatively connected to the water tank. The filling opening is surrounded by a funnel edge of the nozzle element, which is configured to receive a cover of the filler neck. The filler neck further comprises a vent opening for venting the water tank. According to aspects of the invention, the nozzle element comprises an overflow opening configured independently of the filling opening and the vent opening. That is to say, the overflow opening is configured in addition to the filling opening and the vent opening. The advantage can be seen in that the cover can be configured to be fully closed and therefore does not need to comprise an opening for venting or aerating the water tank. Furthermore, the water tank can be filled completely with water, which can easily flow out via the overflow opening if there is an excess.

In particular, if the overflow opening is connected to an overflow pipe, a targeted water flow of excess water in the water tank can be achieved.

Particularly advantageous is to place the overflow opening in operative connection with a bodyshell of the motor vehicle. This makes it easy to discharge the water to the environment in a targeted manner, for example via an opening configured in the bodyshell. Preferably, the overflow opening is connected to the bodyshell with a through-flow element, in particular a flexible hose.

The overflow opening is configured at the funnel edge, completely penetrating it. This means that the water tank can preferably be fully filled so that a filling interval can be reduced.

A preferred seal between the cover and the nozzle element may be achieved, provided that the inner surface of the funnel edge is configured to receive the cover in a sealed manner.

That is to say, the cover may be received in the nozzle element. The cover could comprise a sealing element, e.g. in the form of an O-ring, if the cover is a hinged cover.

Preferably, the cover is configured as a screw cover and has a thread on its lateral surface, which is complementary to a counter thread configured on an inner surface of the funnel edge. This makes it easy to realize the seal without an additional element.

For ease of use, that is to say, to simplify opening and closing the filling opening, the cover comprises an actuating element, which is preferably ergonomically configured.

Advantageously, the vent opening is operatively connected to the water tank, in particular by means of a flexible connecting element.

The filler neck can be positioned independently of the water tank and, in particular, the filler neck can be produced economically and independently of the water tank if the drain cylinder is operatively connected to the water tank with a hose.

BRIEF DESCRIPTION OF THE DRAWINGS

Additional advantages, features, and details of the invention arise from the following description of preferred exemplary embodiments, as well as with reference to the drawings. The features and feature combinations specified hereinabove in the description, as well as the features and feature combinations mentioned hereinafter in the description of the drawings and/or shown alone in the drawings, can be used not only in the respectively specified combination, but also in other combinations, or on their own, without departing from the scope of the invention. Identical or functionally identical elements are assigned identical reference numbers. The figures show.

DETAILED DESCRIPTION OF THE INVENTION

Figure 1:
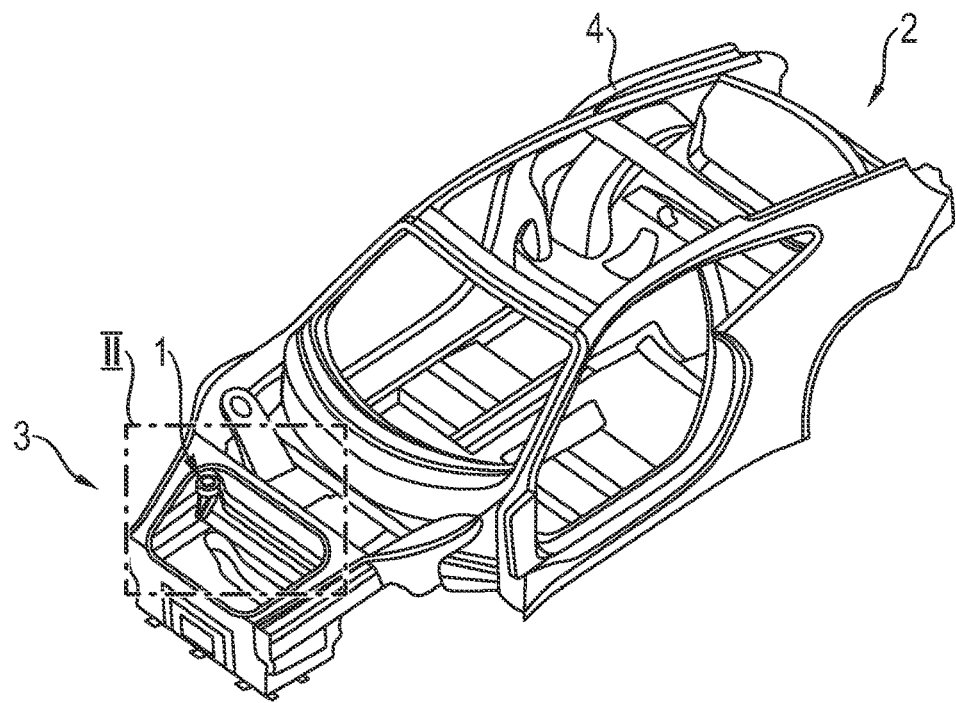
FIG. 1 in a perspective view, a bodyshell of a motor vehicle with a filler neck according to aspects of the invention of a water tank of the motor vehicle, FIG. 2 in a detailed view II, the filler neck according to aspects of the invention in the bodyshell, FIG. 3 in a perspective view, the filler neck according to aspects of the invention, FIG. 4 in a perspective view, the filler neck according to aspects of the invention, FIG. 5 in a further perspective view, the filler neck according to aspects of the invention, FIG. 6 in a further perspective view, the filler neck according to aspects of the invention, FIG. 7 in a further perspective view, the filler neck according to aspects of the invention, and FIG. 8 in a perspective view, the filler neck according to aspects of the invention.
Figure 2:
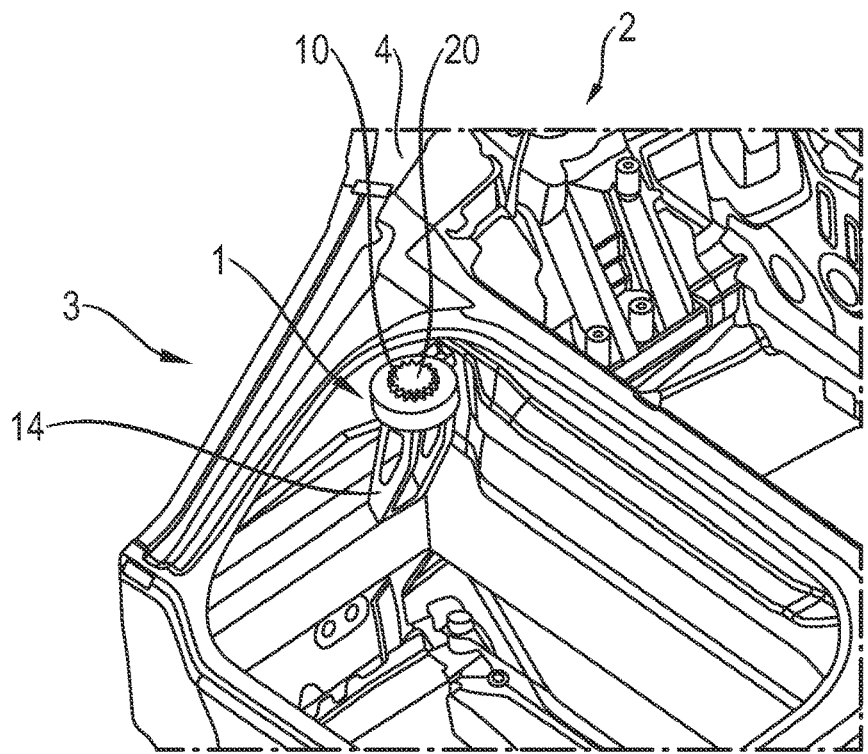
Figure 3:
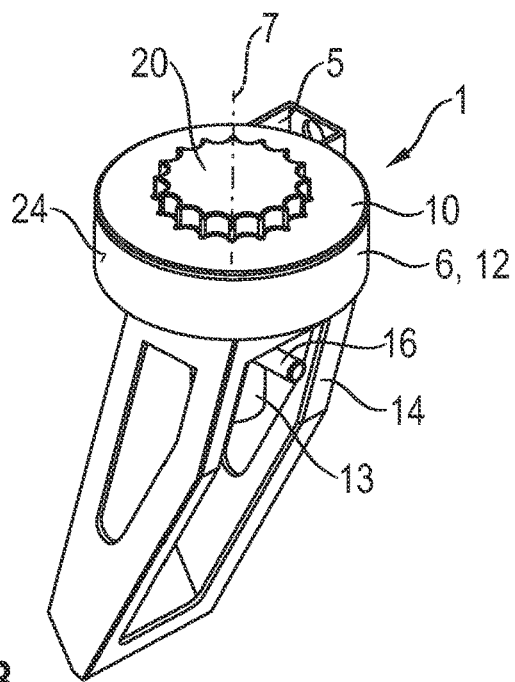
Figure 4:
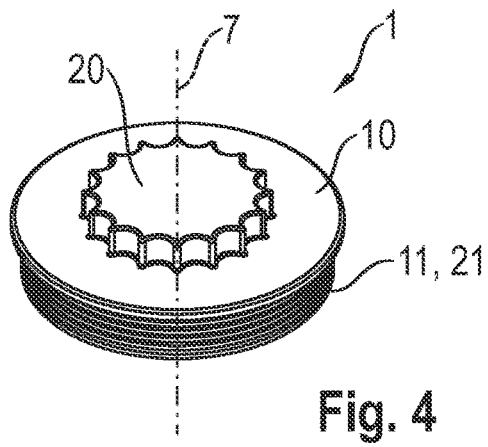
Figure 5:
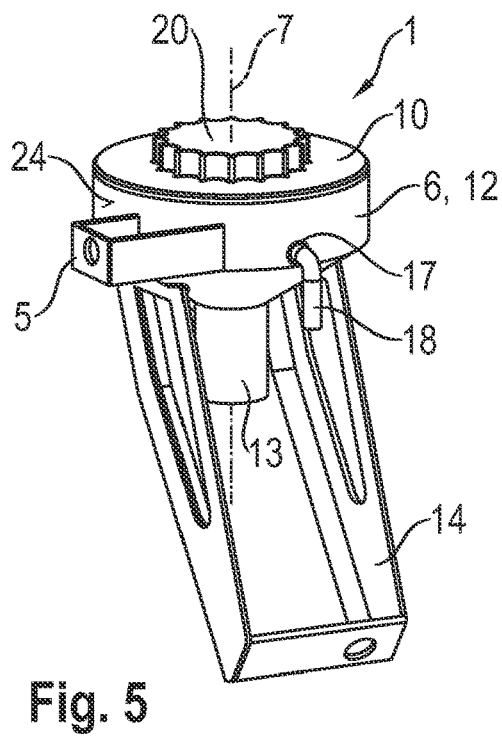
Figure 6:
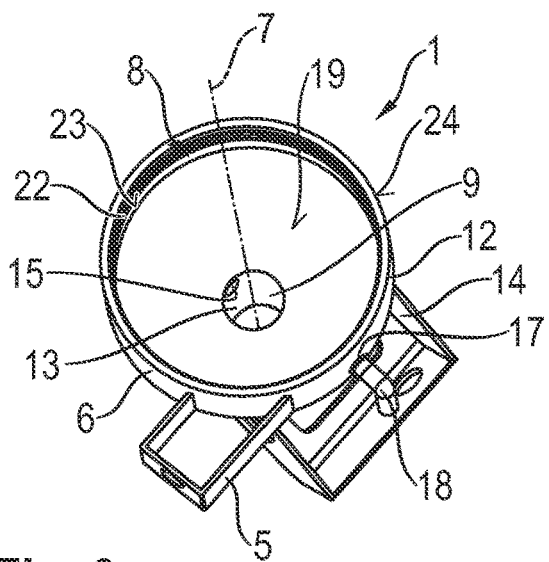
Figure 7:
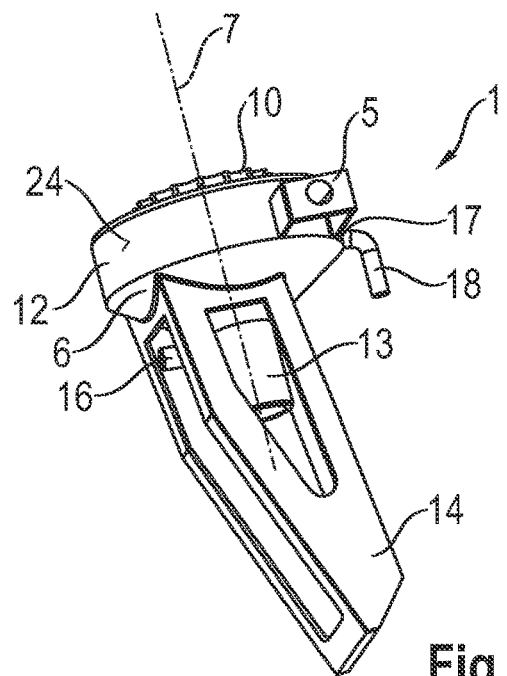
Figure 8:
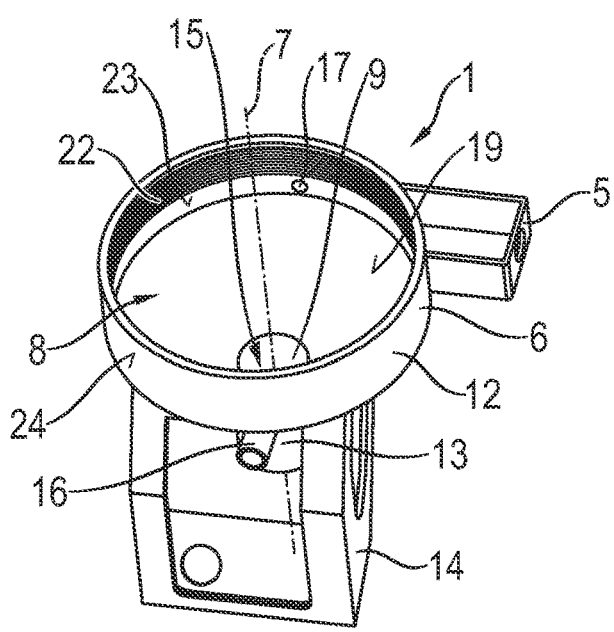

A filler neck 1 according to aspects of the invention of a water tank (not shown in more detail) of a motor vehicle 2, is positioned in a front region 3 of a bodyshell 4 of the motor vehicle 2, as shown in FIGS. 1 and 2. The filler neck 1 is attached to the bodyshell 4 by means of a mounting element 5 independent of the water tank. The filler neck 1 is necessary to fill the water tank with water. Preferably, the water tank is to be arranged below the filler neck 1. However, it could also be positioned next to the filler neck 1.

In FIGS. 3 to 8, the filler neck 1 according to aspects of the invention is illustrated in various perspective views for improved explanation.

The filler neck 1 comprises a funnel-shaped nozzle element 6, which is rotationally symmetrical about its longitudinal axis 7. It has a filling opening 8 and a drain opening 9 opposite along the longitudinal axis 7. The filling opening 8 can be closed by means of a cover 10 of the filler neck 1.

The cover 10, which is also rotationally symmetric, is configured in the form of a screw cover and has a thread 21 on its lateral surface 11, which is complementary to a counter thread 22 configured on a funnel edge 12 of the filler neck 1. The counter thread 22 is configured on an inner surface 23 of the funnel edge 12. In other words, in the closed state of the filler neck 1, the lateral surface 11 is received in the funnel edge 12.

A flow-through drain cylinder 13 of the nozzle element 6 is arranged at the drain opening 9, which is operatively connected to the water tank by means of a hose (not shown in more detail). In other words, the water can flow from the nozzle element 6 into the water tank via the hose.

In addition to the mounting element 5, which is arranged on an outer surface 24 of the funnel edge 12, a support element 14 is configured on the nozzle element 6, which also serves to secure the filler neck 1 in the motor vehicle 2, in particular on the bodyshell 4. A geometry of the mounting element 5 and of the support element 14 can be freely selected and adapted to the conditions of the bodyshell 4.

The filler neck 1 according to aspects of the invention thus has the drain opening 9 for filling the water tank. Furthermore, the filler neck 1 according to aspects of the invention has a vent opening 15, which is operatively connected to a vent line configured in the water tank. That is to say, in other words, a vent pipe 16 configured to allow through-flow with the vent opening 15 is connected to the vent line, wherein the connection is realized with the aid of a further hose, which is not shown in more detail.

With the cover 10 removed, enough water must be filled into the water tank via the filler neck 1 so that the water is in the nozzle element 6. The filling opening 8 must now be closed using the cover 10. If an excess of water is present in the nozzle element 6, this excess can flow out of the nozzle element 6 via an overflow opening 17, so that the cover 10, which is configured to protrude into the nozzle element 6, can always be screwed onto the nozzle element 6 in a sealing manner. That is to say, in the event of an excess of water in the nozzle element 6, the cover 10 can also be connected to the nozzle element 6 in a sealing manner.

The overflow opening 17 is connected to an overflow pipe 18, wherein the overflow pipe 18 is operatively connected to a passage opening configured in the bodyshell 4 by means of a through-flow element in the form of an additional hose (not shown in more detail), so that the excess water can easily be discharged into the surroundings.

The overflow opening 17 is configured at the funnel edge 12, completely penetrating it in the radial direction, and is arranged close to a drainage surface 19 of the nozzle element 6. Furthermore, the overflow opening 17 is arranged opposite the vent opening 15, thus offset in the circumferential direction by 180°. It is also positioned along the longitudinal axis 7 on the filler neck 1 with a height offset, as the vent opening 15 is arranged below the drainage area 19 and the overflow opening 17 is arranged above the drainage area 19.

If the water tank is filled when the filler opening 8 is closed and the water level drops, air may flow into the water tank via the overflow opening 17. If the water tank is pressurized, for example during heating, air may escape through the overflow opening. Thus, the cover 10 may be simply configured without venting elements.

For preferred actuation, the cover 10 comprises an actuating element 20, which can be used to twist open or twist closed the cover 10 easily and securely.

Preferably and economically, the filler neck 1 and the cover 10 are made of a plastic.

The filler neck 1 may be manufactured and mounted independently of the water tank, as it is operatively connected to the water tank by means of the hose. The filler neck 1 therefore has a large filling opening 8 relative to the drain opening 9, making it convenient and comfortable to pour in the water.

LIST OF REFERENCE NUMBERS

1 Filler neck
2 Motor vehicle
3 Front area
4 Bodyshell
5 Mounting element
6 Nozzle element
7 Longitudinal axis
8 Filling opening
9 Drain opening
10 Cover
11 Lateral surface
12 Funnel edge
13 Drain cylinder
14 Support element
15 Vent opening
16 Vent pipe
17 Overflow opening
18 Overflow pipe
19 Drainage area
20 Actuating element
21 Thread
22 Counter thread
23 Inner surface
24 Outer surface

What is claimed is:

1. A filler neck of a water tank of a motor vehicle, said filler neck comprising:
   a nozzle element having a cylindrical wall defining a filling opening at a top end of the filler neck, a mechanical thread disposed on an interior surface of the cylindrical wall for receiving a cover of the filler neck, a frustoconical shaped wall extending downwardly from the cylindrical wall and defining both a frustoconical shaped drainage area and a drain opening, a vent opening for venting the water tank, a drain cylinder extending from the drain opening, and an overflow opening configured independently of the filling opening and the vent opening, the overflow opening being positioned through the cylindrical wall at a location below the mechanical thread and above the frustoconical shaped drainage area, the vent opening being disposed through a wall of the drain cylinder at a location below the overflow opening and the frustoconical shaped drainage area,
   wherein the drain cylinder is configured to be in operative connection with the water tank,
   wherein the filling opening defines a longitudinal axis of the filler neck, and
   wherein the vent opening is positioned closer to the longitudinal axis than the overflow opening.

2. The filler neck according to claim 1, wherein the overflow opening is connected to an overflow pipe.

3. The filler neck according to claim 1, wherein the overflow opening is in operative connection with a bodyshell of the motor vehicle.

4. The filler neck according to claim 3, wherein the overflow opening is connected to the bodyshell by a through-flow element.

5. The filler neck according to claim 1, wherein a lateral surface of the cover includes a mating mechanical thread, which mating mechanical thread is complementary to said mechanical thread disposed on the interior surface of the cylindrical wall.

6. The filler neck according to claim 1, wherein the cover comprises an actuating element.

7. The filler neck according to claim 1, wherein the vent opening is configured to be operatively connected to the water tank.

8. The filler neck according to claim 1, wherein the drain cylinder is configured to be operatively connected to the water tank with a hose.

9. The filler neck according to claim 1, wherein the drain opening is disposed at an intersection between the frustoconical shaped drainage area and the drain cylinder.

10. The filler neck according to claim 1 further comprising a mounting element protruding outwardly from an exterior surface of the cylindrical wall, wherein the mounting element is configured to be mounted to a bodyshell of the motor vehicle.

11. The filler neck according to claim 1 further comprising a support element protruding downwardly from an exterior surface of the frustoconical shaped wall, wherein the support element is configured to be mounted to a bodyshell of the motor vehicle.

12. The filler neck according to claim 1 further comprising:
   a mounting element protruding outwardly from an exterior surface of the cylindrical wall, wherein the mounting element is configured to be mounted to a bodyshell of the motor vehicle; and
   a support element protruding downwardly from an exterior surface of the frustoconical shaped wall, wherein the support element is configured to be mounted to the bodyshell of the motor vehicle.

13. A motor vehicle comprising the filler neck of claim 1.

14. A motor vehicle bodyshell comprising the filler neck of claim 1.

* * * * *